(12) United States Patent  
Shimada (10) Patent No.: US 7,315,101 B2  
(45) Date of Patent: Jan. 1, 2008

(54) MAGNETIC BEARING APPARATUS (75) Inventor: Akihiro Shimada, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/470,852

(22) Filed: Sep. 7, 2006

(65) Prior Publication Data

US 2007/0273219 A1   Nov. 29, 2007

Related U.S. Application Data

(62) Division of application No. 10/500,572, filed as application No. PCT/JP03/08544 on Jul. 4, 2003.

(51) Int. Cl.
*H02K 7/09* (2006.01)
(52) U.S. Cl. ........................ 310/90.5; 310/64
(58) Field of Classification Search ............. 310/90.5, 310/90, 52, 58, 64
See application file for complete search history.

(56) References Cited

U.S. PATENT DOCUMENTS

| 3,573,512 | A | * | 4/1971 | Lawson et al. ............... 310/10 |
| 3,690,317 | A | * | 9/1972 | Millman ................ 128/200.16 |
| 5,693,994 | A | * | 12/1997 | New ......................... 310/90.5 |
| 5,720,160 | A | * | 2/1998 | Traxler et al. ................. 57/76 |
| 5,814,908 | A | * | 9/1998 | Muszynski .................... 310/62 |
| 2002/0074870 | A1 | * | 6/2002 | Vandervort et al. ........... 310/58 |

FOREIGN PATENT DOCUMENTS

| JP | 62-141441 U | 9/1987 |
| JP | 03-114557 A | 5/1991 |
| JP | 03-114560 A | 5/1991 |
| JP | 8-61366 A | 3/1996 |
| JP | 9-29583 A | 2/1997 |
| JP | 09-257318 A | 10/1997 |
| JP | 2000-157068 A | 6/2000 |

OTHER PUBLICATIONS

Vortex Tube, pp. 1-8.

* cited by examiner

*Primary Examiner*—Dang Le
*Assistant Examiner*—Nguyen N. Hanh
(74) *Attorney, Agent, or Firm*—Sughrue Mion, PLLC (57) ABSTRACT

In order to obtain a magnetic bearing apparatus in which a large cooling effect is exerted by a simple configuration, fins 15 which form an air flow in a rearward direction are disposed in a rear portion and outer diameter of a rotary shaft 1, a generator 16 which converts an air flow produced by rotation of the fins 15 to a compressed vortex flow, and which has an axial through hole is fixed with being separated from the fins 15 by an appropriate gap, and a tube 20 in which the inner diameter is larger than the diameter of the through hole 19 of the generator 16, and which has a control valve 21 at the rear end is provided in rear of the generator 16. Cooling wind is produced by a driving force of the rotary shaft 1. Cooling wind flow paths 22 through which the cooling wind is to be passed, and which axially elongate are formed in the rotary shaft 1.

4 Claims, 8 Drawing Sheets

MAGNETIC BEARING APPARATUS

This is a divisional of application Ser. No. 10/500,572 filed Jul. 1, 2004, which is a National Stage application of PCT/JP2003/08544 filed Jul. 4, 2003. The entire disclosure of the prior application, application Ser. No. 10/500,572 is hereby incorporated by reference.

TECHNICAL FIELD

The present invention relates to a magnetic bearing apparatus which is to be used in a spindle unit of a machine tool or the like, and more particularly to a cooling structure for such a magnetic bearing apparatus.

BACKGROUND ART

Usually, a magnetic bearing apparatus is used for the primary purpose of realizing ultrahigh speed rotation which is hardly realized by a rolling bearing apparatus that is conventionally widely used. As compared with a rolling bearing apparatus, in a magnetic bearing apparatus, ultrahigh speed rotation is enabled, but it is usual that the main unit of the bearing apparatus generates a large amount of heat because of an increased number of electrical components. In a conventional countermeasure for cooling a magnetic bearing apparatus, for example, air is supplied from the outside into a unit by a compressor or the like, and the supplied air flow is passed over the surface of a rotary shaft to conduct a cooling operation. Such a cooling structure for a magnetic bearing apparatus is disclosed in, for example, JP-A-8-61366.

In the above-described cooling structure, however, the air flow which is close to the ambient temperature is simply circulated from the outside into the unit. Therefore, the structure has problems in that the cooling performance is not excellent, and that apparatuses (such as a compressor) for supplying the air flow from the outside into the unit are additionally required and hence the scale of cooling facilities becomes large.

DISCLOSURE OF THE INVENTION

The invention has been conducted in order to solve the above problems. It is an object of the invention to obtain a magnetic bearing apparatus in which a large cooling effect can be exerted by a simple configuration.

In order to attain the object, the invention is configured so as to comprise: cooling wind producing means for producing cooling wind of a low temperature with using a driving force of a rotary member; and a cooling wind flow path through which the low-temperature cooling wind produced by the cooling wind producing means is to flow into a magnetic bearing apparatus.

The cooling wind producing means comprises: high-speed air flow producing means for producing a high-speed air flow with using the driving force of the rotary member; converting means for converting the high-speed air flow produced by the high-speed air flow producing means, to a vortex flow; an air flow path through which the high-speed vortex flow converted by the converting means is to flow; and a control valve which is disposed on a side of the air flow path opposite to the converting means.

The low-temperature cooling wind is produced with using ultrahigh speed rotation of the rotary member. Therefore, it is possible to obtain a magnetic bearing apparatus in which a large cooling effect can be exerted by a simple configuration.

Alternatively, the magnetic bearing apparatus comprises: cooling wind producing means that produces cooling wind of a low temperature, and that has: fins which are disposed on a rotary shaft, and which produces an axial air flow by a driving force of the rotary shaft; a generator which is fixed with forming a predetermined gap with respect to the fins, and which produces a high-speed vortex flow; a tube through which the high-speed vortex flow produced by the generator is to flow; and a control valve which is disposed on a side of the tube opposite to the generator; and a cooling wind flow path through which the low-temperature cooling wind produced by the cooling wind producing means is to flow into the magnetic bearing apparatus.

The low-temperature cooling wind is produced with using ultrahigh speed rotation of a rotary member. Therefore, it is possible to obtain a magnetic bearing apparatus in which a large cooling effect can be exerted by a simple configuration.

The cooling wind flow path is disposed in the rotary shaft portion so as to axially elongate.

Therefore, the rotary shaft portion can be efficiently cooled.

The cooling wind flow path has: a cooling wind flow path disposed in the case; and a pipe which guides the low-temperature cooling wind to the cooling wind flow path disposed in the case.

Therefore, not only the rotary shaft portion, but also the whole of the magnetic bearing apparatus can be efficiently cooled.

Alternatively, the magnetic bearing apparatus comprises: cooling wind producing means that produces cooling wind of a low temperature, and that has: fins which are disposed on an axial magnetic bearing disc, and which produces an air flow directed in an outer radial direction of the axial magnetic bearing disc; a supply port which is positioned in an outer circumferential portion of the fins, and through which the air flow produced by the fins is introduced and ejected as a high-speed air flow in the outer radial direction; a generator which converts the high-speed air flow ejected from the supply port, to a vortex flow; an air flow path through which the high-speed vortex flow produced by the generator is to flow; and a control valve which is disposed on a side of the air flow path opposite to the generator; and a cooling wind flow path through which the low-temperature cooling wind produced by the cooling wind producing means is to flow into the magnetic bearing apparatus.

The low-temperature cooling wind is produced with using ultrahigh speed rotation of a rotary member. Therefore, it is possible to obtain a magnetic bearing apparatus in which a large cooling effect can be exerted by a simple configuration. Among portions of rotary portions, particularly, the axial magnetic bearing disc has the largest outer diameter, and hence the largest cooling effect is attained as compared with cases where a high-speed vortex flow is produced by other portions.

A guide portion which guides the low-temperature cooling wind to a rotary shaft portion is disposed.

The cooling wind flow path has: a cooling wind flow path which is disposed in the case, and through which the low-temperature cooling wind produced by the cooling wind producing means is to flow; a guide plate which guides the cooling wind that has been passed through the cooling flow path, to a rotary shaft portion; and a cooling wind flow path which is disposed in the rotary shaft portion, and through which the cooling wind that has been guided by the guide plate is to axially flow, thereby cooling the rotary shaft portion.

Therefore, also the rotary shaft portion can be efficiently cooled, and the whole of the magnetic bearing apparatus can be efficiently cooled.

Alternatively, the magnetic bearing apparatus comprises: cooling wind producing means that produces cooling wind of a low temperature, and that has: fins which are disposed on an axial magnetic bearing disc, and which produces an air flow directed in an outer radial direction of the axial magnetic bearing disc; an air suction port which is positioned in an outer circumferential portion of the fins, and through which the air flow produced by the fins is introduced and ejected as a high-speed air flow in the outer radial direction; an air flow path through which the high-speed air flow ejected from the air suction port is to flow; a generator which converts the high-speed air flow ejected from the air flow path, to a vortex flow; a tube through which the high-speed vortex flow produced by the generator is to flow; and a control valve which is disposed on a side of the tube opposite to the generator; and a cooling wind flow path through which the low-temperature cooling wind produced by the cooling wind producing means is to flow into the magnetic bearing apparatus.

The low-temperature cooling wind is produced with using ultrahigh speed rotation of a rotary member. Therefore, it is possible to obtain a magnetic bearing apparatus in which a large cooling effect can be exerted by a simple configuration.

BEST MODE FOR CARRYING OUT THE INVENTION

Embodiment 1

Hereinafter, Embodiment 1 of the invention will be described with reference to FIGS. 1 to 3.

Embodiment 1 of the invention shows a magnetic bearing spindle unit in which a magnetic bearing apparatus is used in a spindle for rotating a tool. FIG. 1 is a section view showing the whole configuration of the magnetic bearing spindle unit, FIGS. 2A-2C are views which show a generator structure to be used in the magnetic bearing spindle unit, and in which FIG. 2A is a front view, FIG. 2B is a section view taken along the line Y-Y in FIG. 2A, and FIG. 2C is a rear view of FIG. 2A, and FIG. 3 is a section view showing a control valve to be used in the magnetic bearing spindle unit, and taken along the line X-X' in FIG. 1

The magnetic bearing spindle unit is configured in the following manner.

Namely, a front radial magnetic bearing rotor $2a$ which is formed by stacking annular magnetic steel sheets, an axial magnetic bearing disc 3 made of a magnetic material, a spindle motor rotor 4 (positioned between the axial magnetic bearing disc 3 and a rear radial magnetic bearing rotor $2b$), and the rear radial magnetic bearing rotor $2b$ which is formed by stacking annular magnetic steel sheets are fitted and fixed to a rotary shaft 1 which incorporates a tool holder holding mechanism. At the left end of the rotary shaft 1, although not shown, a rotary tool is disposed on the tool holder holding mechanism 47 via a tool holder. When the tool holder is to be fixed to the tool holder holding mechanism 47, a pushrod 49 is pushed toward the left side of the figure against the pressing force of a spring member 48 by a hydraulic cylinder 45 for attaching and detaching the tool holder, to open a collet-like tool holder holding portion 50 which is positioned in the left end of the figure, and the tool holder is inserted into the opened portion. When the pushing force on the pushrod 49 is then released, a tool is held to the tool holder holding portion 50 by the pushing force of the spring member 48. The tool holder holding mechanism 47 and the rotary shaft 1 are enabled by the axial pushing force of the spring member 48 to be integrally rotated.

A front radial magnetic bearing stator $5a$ and a rear radial magnetic bearing stator $5b$ are placed in a radial direction on outer diameter portions of the radial magnetic bearing rotors $2a$, $2b$ of the rotary shaft 1, with forming an adequate small gap (usually, about 0.5 to 1.0 mm). When energized, the radial magnetic bearing stator $5a$ forms four electromagnets around the radial magnetic bearing rotor $2a$. When energized, similarly, the radial magnetic bearing stator $5b$ forms four electromagnets around the radial magnetic bearing rotor $2b$.

In the vicinity of the axial magnetic bearing disc 3 of the rotary shaft 1, a pair of axial magnetic bearing stators $6a$, $6b$ (the load side axial magnetic bearing stator $6a$ and the opposite-to-load side axial magnetic bearing stator $6b$) having an annular electromagnet are placed so as to sandwich the axial magnetic bearing disc 3 with forming an adequate small gap (usually, about 0.5 to 1.0 mm) in an axial direction. The axial magnetic bearing stators $6a$, $6b$ are axially positioned by an annular collar 27.

In the vicinity of the spindle motor rotor 4, a spindle motor stator 7 for rotating the rotary shaft 1 is placed with forming an adequate small gap in a radial direction from an outer diameter portion of the spindle motor rotor 4.

Oil jackets $8a$, $8b$, 9 for cooling the stators are attached to outer diameter portions of the radial magnetic bearing stators $5a$, $5b$ and the spindle motor stator 7, respectively. In the FIG. $8a$ denotes the oil jacket for cooling the front radial magnetic bearing stator, $8b$ denotes the oil jacket for cooling the rear radial magnetic bearing stator, and 9 denotes the oil jacket for cooling the spindle motor stator.

The rotary shaft 1, the radial magnetic bearing stators $5a$, $5b$, the axial magnetic bearing stators $6a$, $6b$, and the spindle motor stator 7 are housed in a cylindrical frame 10 via the oil jackets $8a$, $8b$, 9, and a load side bracket 11 and an opposite-to-load side bracket 12 are attached to the ends of the frame 10, respectively. Also the axial magnetic bearing stators 6a, 6b are housed in the frame 10.

Non-contact displacement sensors 14a, 14b for controlling a magnetic bearing are attached to the load side bracket 11 and the opposite-to-load side bracket 12 via an adequate small gap (usually, about 0.5 mm) with respect to the rotary shaft 1, respectively.

Protection bearings (also called touchdown bearings) 13a, 13b for preventing the unit from being damaged in case of emergency are attached to the load side bracket 11 and the opposite-to-load side bracket 12 via an adequate small gap (usually, about 0.2 mm) with respect to the rotary shaft 1, respectively. Namely, when the magnetic bearing apparatus normally operates, the protection bearings 13a, 13b are not in contact with the rotary shaft 1, and, when the magnetic bearing apparatus is out of control due to any cause, are in contact with the rotary shaft 1 to receive the rotary shaft 1, thereby preventing the unit from being damaged.

The non-contact displacement sensors 14a, 14b which measure radial and axial positions of the rotary shaft 1 are fixed to the load side bracket 11 and the opposite-to-load side bracket 12, respectively. On the basis of output signals of the non-contact displacement sensors 14a, 14b, in air gaps between the radial magnetic bearing stators 5a, 5b and the radial magnetic bearing rotors 2a, 2b, and between the axial magnetic bearing stators 6a, 6b and the axial magnetic bearing disc 3, an adequate magnetic attractive force is generated by a magnetic bearing driver which is not shown, whereby the rotary shaft 1 is supported in a non-contact manner at a target position separated from the stators 5a, 5b, 6a, 6b, 7. When an adequate voltage is applied to the spindle motor stator 7 under the non-contact state, ultrahigh speed rotation (about 70,000 r/min or higher) of the rotary shaft 1 is realized.

The number of rotations of the rotary shaft 1 is detected by an encoder gear secured to the rotary shaft 1, and an encoder head 51 secured to the opposite-to-load side bracket 12. The detected number of rotations is fed back to the magnetic bearing driver.

A plurality of fins 15 for forming an air flow in a rearward direction (to the side opposite to the load) are disposed at regular intervals in a rear portion of the rotary shaft 1. A generator (converting means) 16 is fixed to a fixing angle 44 supported by the opposite-to-load side bracket 12, with being separated from the fins 15 by an appropriate gap.

Figures 2A, 2B:
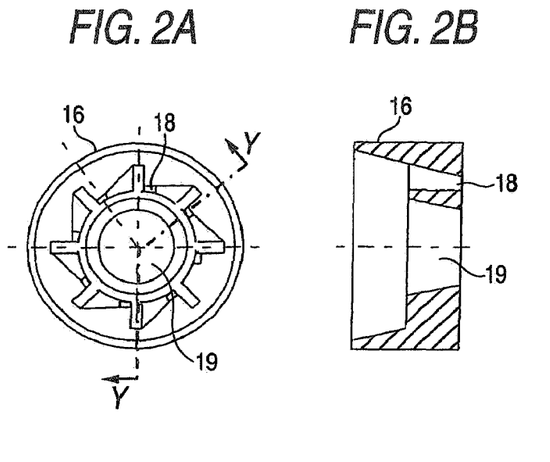
FIGS. 2A-2C are views showing a generator structure to be used in the magnetic bearing spindle unit of Embodiment 1 of the invention.
Figure 2C:
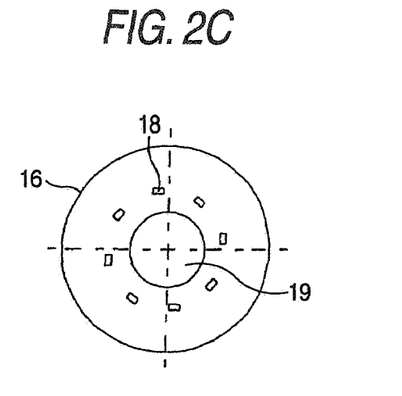
Figure 3:
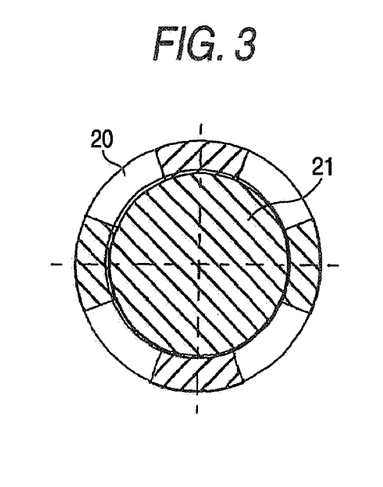
FIG. 3 is a section view taken along the line X-X' in FIG. 1.

FIGS. 2A-2C show only the generator 16. In the generator 16, in order to convert a high-speed air flow which is produced by a synergistic action with the fins 15 to a high-pressure vortex flow, plural fin members (in FIGS. 2A-2C, eight fin members) are formed in such a manner that each member is more tapered as further moving from a high-speed air flow suction port 17 toward vortex flow discharge ports 18 (in FIGS. 2A-2C, formed at eight places) and formed in a spiral direction to an axial direction of the generator 16. An axial through hole 19 is formed in a further inner diameter portion of the generator 16.

A tube (air flow path) 20 having an inner diameter which is larger than the diameter of the through hole 19 of the generator 16 is connected to the rear side of the generator 16. A control valve 21 which is shown in FIG. 3, and which controls the amount of part of the high-pressure vortex flow that is to be discharged to the outside air is disposed at the rear end of the tube 20. The control valve 21 is disposed on the tube 20 by screwing hot-wind discharge amount adjusting threads 46 formed in the outer circumferential portion of the valve, into the tube 20.

Figure 1:
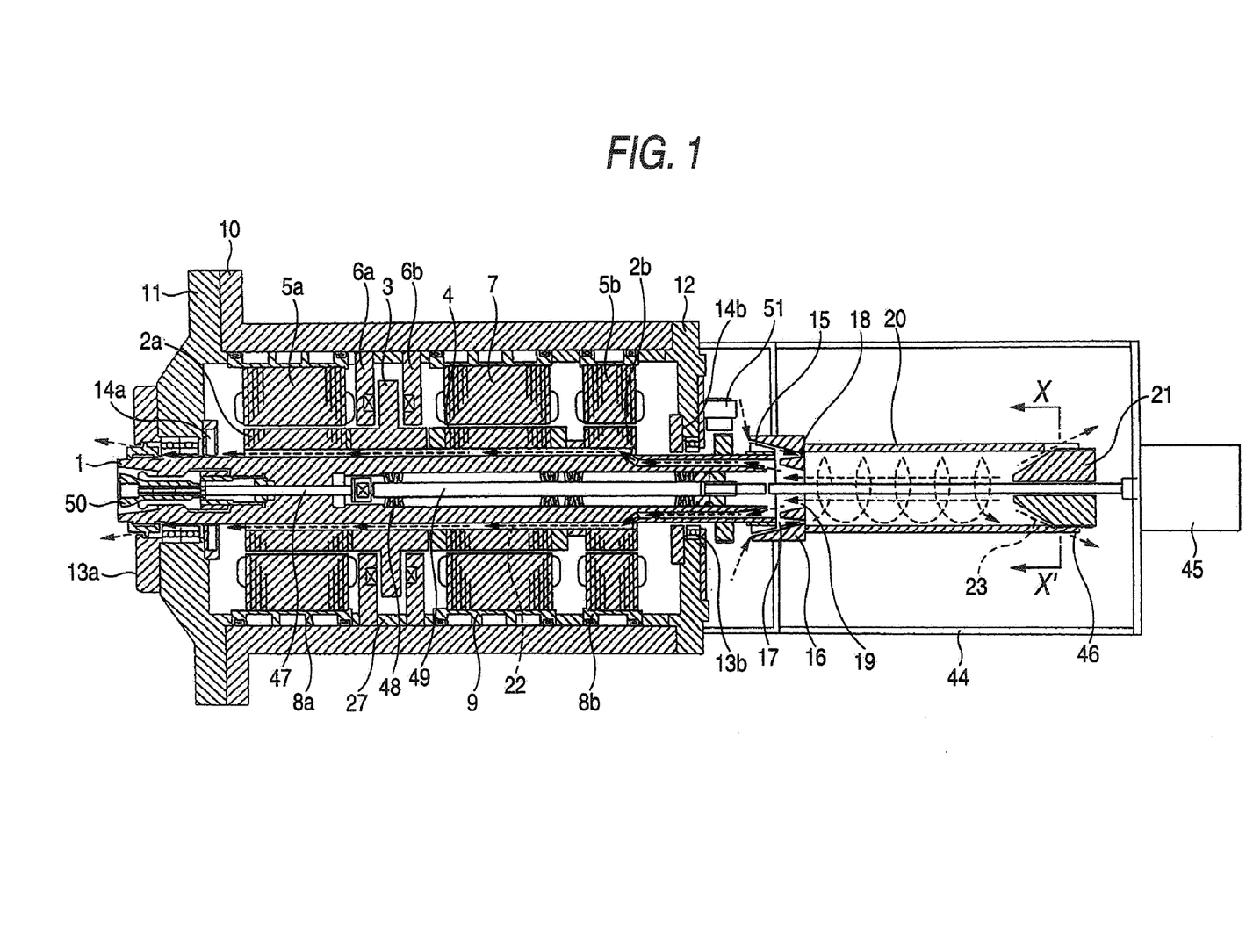
FIG. 1 is a section view showing the whole configuration of a magnetic bearing spindle unit of Embodiment 1 of the invention.

In the portion of the rotary shaft 1, as shown in FIG. 1, a plurality of cooling wind flow paths 22 are formed at regular intervals in the circumferential direction. Each of the cooling wind flow paths 22 is configured by a first cooling wind flow path and a second cooling wind flow path. The first cooling wind flow path has a configuration in which the flow path axially elongates in the rotary shaft 1, one end is opened in an axial end on the side of the fins 15, and the other end is opened in an inner wall portion of the rear radial magnetic bearing rotor 2b. The second cooling wind flow path is configured by: a spline-like portion which is formed in an outer circumferential portion of the rotary shaft 1 so as to communicate with the opening of the first cooling wind flow path on the side of the rear radial magnetic bearing rotor 2b, and elongate to the load-side end portion of the front radial magnetic bearing rotor 2a; and the inner peripheral walls of the rear radial magnetic bearing rotor 2b, the spindle motor rotor 4, the axial magnetic bearing disc 3, the front radial magnetic bearing rotor 2a, and the collar positioned between the rotors. The inner peripheral walls close the opening portion of the spline-like portion.

In Embodiment 1, the fins 15, the generator 16, the tube 20, and the control valve 21 constitute cooling wind producing means for producing cooling wind of a low temperature with using the driving force of the rotary shaft 1 which is rotated at a high speed. The fins 15 and part of the generator 16 constitute compressed air flow producing means. The frame 10, the load side bracket 11, and the opposite-to-load side bracket 12 constitute a case.

The magnetic bearing spindle unit of Embodiment 1 is configured as described above.

According to the structure, since a magnetic bearing spindle unit is usually used at ultrahigh speed rotation in most cases, a high-speed air flow which is directed toward the rear side of the spindle is produced by the fins 15 when the rotary shaft 1 is rotated at an ultrahigh speed. The high-speed air flow is sent into the suction port 17 of the generator 16, and then discharged from the discharge ports 18. Along the way, the generator 16 is tapered and formed in a spiral direction. At the timing when the air flow is discharged from the discharge ports 18, therefore, the air flow is formed as a high-pressure vortex flow, and discharged to the inner circumferential face of the adjacent tube 20, in a tangential direction of the face at a speed close to that of sound. The high-speed vortex flow which is sent into the tube 20 is subjected to a large centrifugal force during a process in which the vortex flow moves toward the control valve 21 that is disposed in the rear of the tube, so that the pressure and the density are rapidly raised, the pipe resistance is increased, and the temperature is raised. As a result, the vortex flow is formed into hot wind to be discharged to the outside air from a hot-wind discharge port 23. At the same time, by the centrifugal force of the high-speed vortex flow, air in the vicinity of the center of the tube 20 is lowered in density, and, while rotating in the same direction as the outer vortex flow of the hot wind, moves in the opposite direction toward the through hole 19 of the generator 16 which is opposite to the hot-wind discharge port 23. During the moving process, because of a decelerating braking action, the inner vortex flow conducts a work on the outer vortex flow, and the temperature is lowered. Therefore, the vortex flow is formed as cooling wind to be discharged from the through hole 19 of the generator 16. This principle of producing such cooling wind was found at about 1930 by a French physicist, Georges Ranque. When compressed air of 7 PMa and 20° is supplied at 640 L/min, air of −55°C. is ejected at 100 L/min from the through hole 19 of the generator 16. Since the through hole 19 is smaller than the inner diameter of the tube 20, only the inner vortex flow formed as cooling wind can be passed through the through hole, so that an efficient structure is attained. Since the cooling wind flow paths 22 which are axially passed are formed inside the rotary shaft 1, the cooling wind discharged from the through hole 19 of the generator 16 moves the inner side of the rotary shaft 1 toward the front side (load side) of the spindle unit as indicated by the arrows. During the process, the cooling wind cools the rotary shaft 1, and is finally discharged from the front side (load side) of the rotary shaft 1 to the outside air.

Namely, this structure is a very simple one in which no driving portion is formed in the cooling wind producing portion, and, with using ultrahigh speed rotation of the rotary shaft 1 itself, can produce high-pressure air to form cooling wind, without using an external compressing machine or the like such as a compressor. The produced cooling wind is passed through the interior of the rotary shaft 1, whereby the rotary shaft 1 can be efficiently cooled.

The amount of the cooling wind which is to be discharged in the direction to the rotary shaft 1 from the through hole 19 of the generator 16 can be controlled by adjusting the amount of the hot wind to be discharged from the hot-wind discharge port 23. In other words, the amount of the cooling wind can be arbitrarily determined by adjusting the control valve 21.

Embodiment 2

Next, Embodiment 2 of the invention will be described with reference to FIGS. 4 and 5A-5C.

Figure 4:
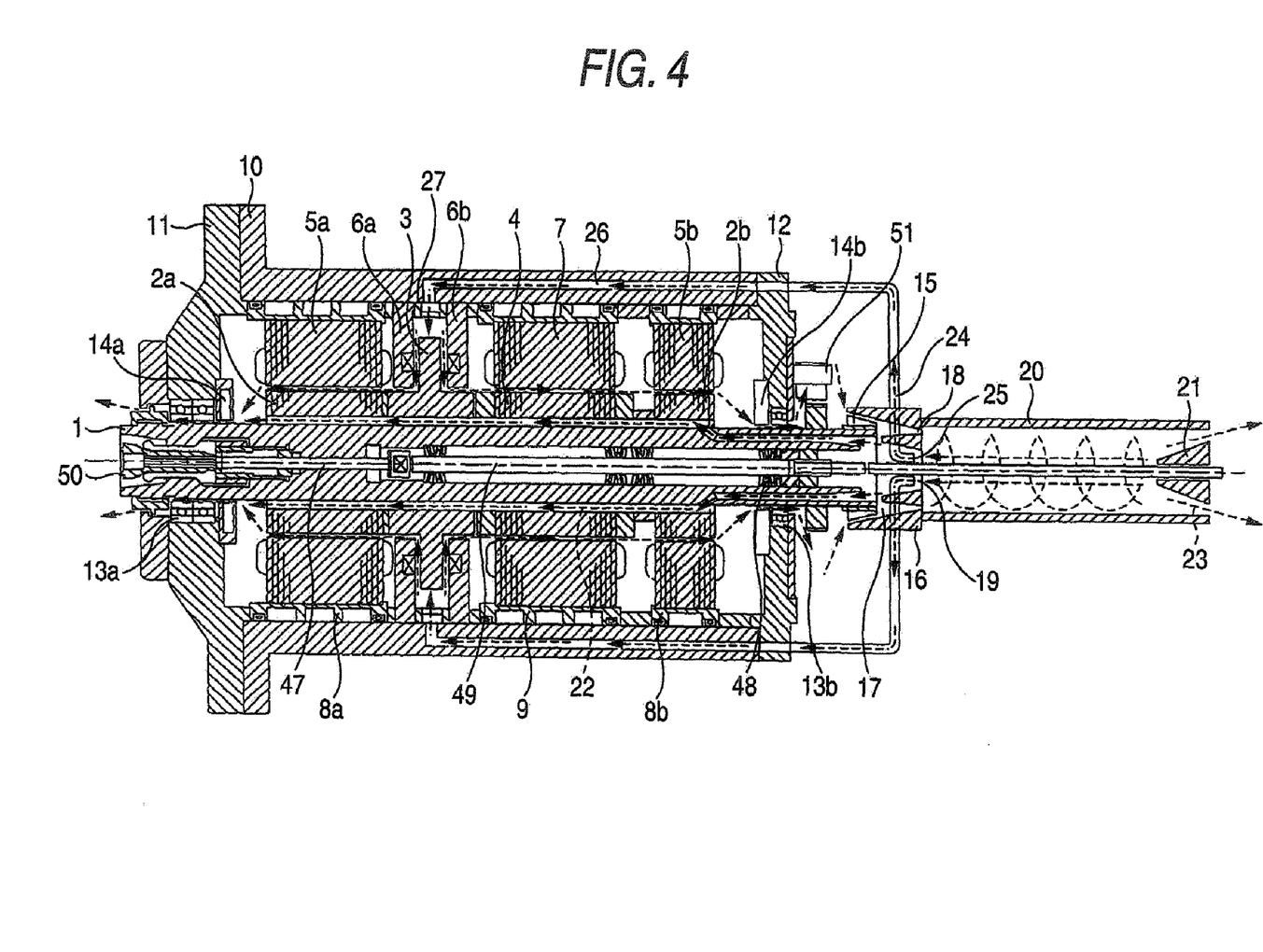
FIG. 4 is a section view showing the whole configuration of a magnetic bearing spindle unit of Embodiment 2 of the invention.
Figure 5A:
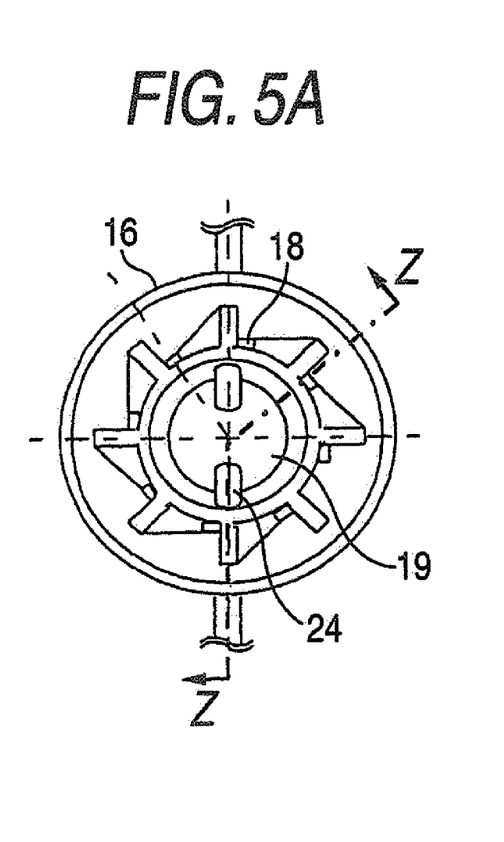
FIGS. 5A-5C are views showing a generator structure to be used in the magnetic bearing spindle unit of Embodiment 2 of the invention.
Figures 5B, 5C:
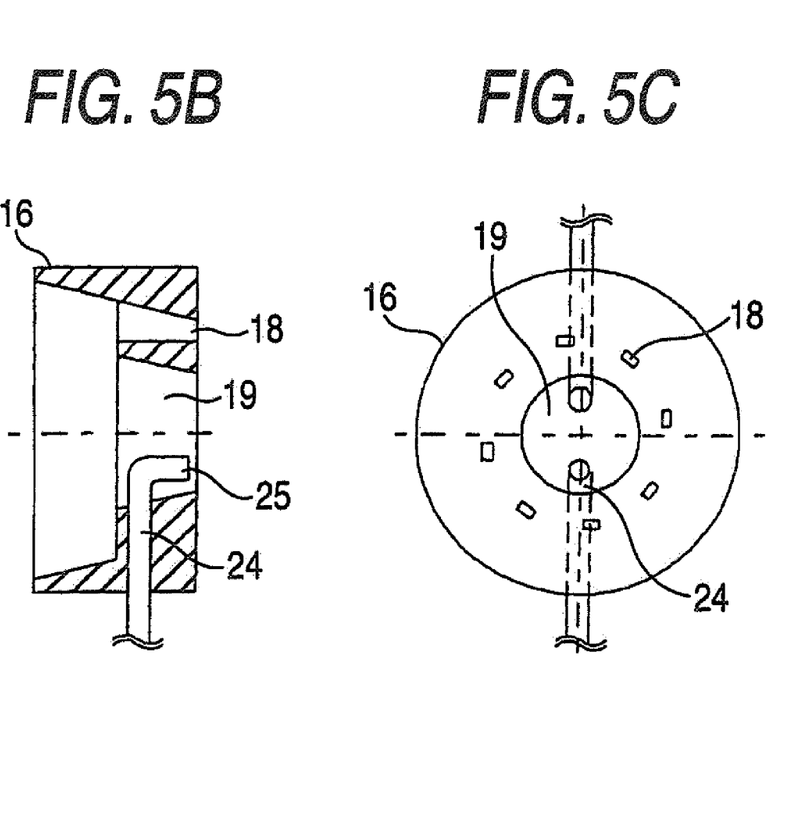

In the same manner as Embodiment 1, also Embodiment 2 of the invention shows a magnetic bearing spindle unit in which a magnetic bearing apparatus is used in a spindle for rotating a tool. FIG. 4 is a section view showing the whole configuration of the magnetic bearing spindle unit, and FIGS. 5A-5C are views which show a generator structure to be used in the magnetic bearing spindle unit, and in which FIG. 5A is a front view, FIG. 5B is a section view taken along the line Z-Z in FIG. 5A, and FIG. 5C is a rear view of FIG. 5A.

The magnetic bearing spindle unit is configured in the following manner.

Namely, a plurality of cooling wind flow paths 26 which axially elongate, and which are positioned at regular intervals in the circumferential direction are formed in an opposite-to-load side bracket 12 and a frame 10 (in the embodiment, two cooling wind flow paths 26 are formed). Cooling wind flow paths 26 which communicate with the cooling wind flow paths 26, respectively, and which are opened in an outer circumferential portion of the axial magnetic bearing disc 3 are formed in an axial positioning collar 27 for the axial magnetic bearing stators 6a, 6b. Each of the cooling wind flow paths 26 is configured so that one end is opened in the outer circumferential portion of the axial magnetic bearing disc 3 and the other end is opened in the external end face of the opposite-to-load side bracket 12.

FIG. 4 shows only a generator 16 which is fixed with being separated from fins 15 by an appropriate gap. A plurality of pipes 24 (in the embodiment, two pipes) are passed and fixed from a side which is further inside the inner diameter of a through hole 19 of the generator 16, and in a radial direction of the generator 16. In each of the pipes 24, one end 25 inside the generator 16 is disposed so as to be directed toward the tube 20.

The other ends of the pipes 24 are connected to the openings of the cooling wind flow paths 26 on the side of the opposite-to-load side bracket 12.

The other components are configured in a similar manner as those of the magnetic bearing spindle unit which has been described in Embodiment 1.

In this structure, when the rotary shaft 1 is rotated at an ultrahigh speed, a high-speed air flow which is directed toward the rear side of the spindle is produced by the fins 15. The high-speed air flow is sent into the suction port 17 of the generator 16, and then discharged from the discharge ports 18. Along the way, the generator 16 is tapered and formed in a spiral direction. At the timing when the air flow is discharged from the discharge ports 18, therefore, the air flow is formed as a high-pressure vortex flow, and discharged to the inner circumferential face of the adjacent tube 20, in a tangential direction of the face at a speed close to that of sound. The high-speed vortex flow which is sent into the tube 20 is subjected to a large centrifugal force during a process in which the vortex flow moves toward the control valve 21 that is disposed in the rear of the tube, so that the pressure and the density are rapidly raised, the pipe resistance is increased, and the temperature is raised. As a result, the vortex flow is formed into hot wind to be discharged to the outside air from the hot-wind discharge port 23. At the same time, by the centrifugal force of the high-speed vortex flow, air in the vicinity of the center of the tube 20 is lowered in density, and, while rotating in the same direction as the outer vortex flow of the hot wind, moves in the opposite direction, toward the through hole 19 of the generator 16 which is opposite to the hot-wind discharge port 23. During the moving process, because of a decelerating braking action, the inner vortex flow conducts a work on the outer vortex flow, and the temperature is lowered. Therefore, the vortex flow is formed as cooling wind to be discharged from the through hole 19 of the generator 16. Since the through hole 19 is smaller than the inner diameter of the tube 20, only the inner vortex flow formed as cooling wind can be passed through the through hole, so that an efficient structure is attained. Since the cooling wind flow paths 22 which are axially passed are formed inside the rotary shaft 1, the cooling wind discharged from the through hole 19 of the generator 16 moves the inner side of the rotary shaft 1 toward the front side of the spindle unit as indicated by the arrows. During the process, the cooling wind cools the rotary shaft 1, and is finally discharged from the front side of the rotary shaft 1 to the outside air. Since the one end 25 of each of the pipes 24 disposed in the generator 16 is disposed so as to be directed toward the tube 20, moreover, part of the cooling wind discharged from the generator 16 is sucked into the pipe 24 as indicated by the arrows, and then is passed through the cooling wind flow path 26 disposed inside the opposite-to-load side bracket 12 and the frame 10 to enter the interior of the unit from the outer diameter portion of the axial positioning collar 27 for the axial magnetic bearing stators 6. The cooling wind entering from the portion of the collar 27 is discharged to the outside air with being passed mainly through the air gaps between the axial magnetic bearing disc 3 and the axial magnetic bearing stators 6a, 6b, the rear radial magnetic bearing rotor 2a and the radial magnetic bearing stator 5a, the spindle motor rotor 4 and the spindle motor stator 7, and the radial magnetic bearing rotor 2b and the radial magnetic bearing stator 5b. During the process in which the cooling wind moves to the outside air, the cooling wind cools the surface of the rotary shaft 1, and the stators.

Namely, this structure can efficiently cool the rotary shaft 1 and the stators on the same principle as that described in Embodiment 1.

Similarly, the amount of the cooling wind can be adjusted by adjusting the control valve 21.

Embodiment 3

Figure 6:
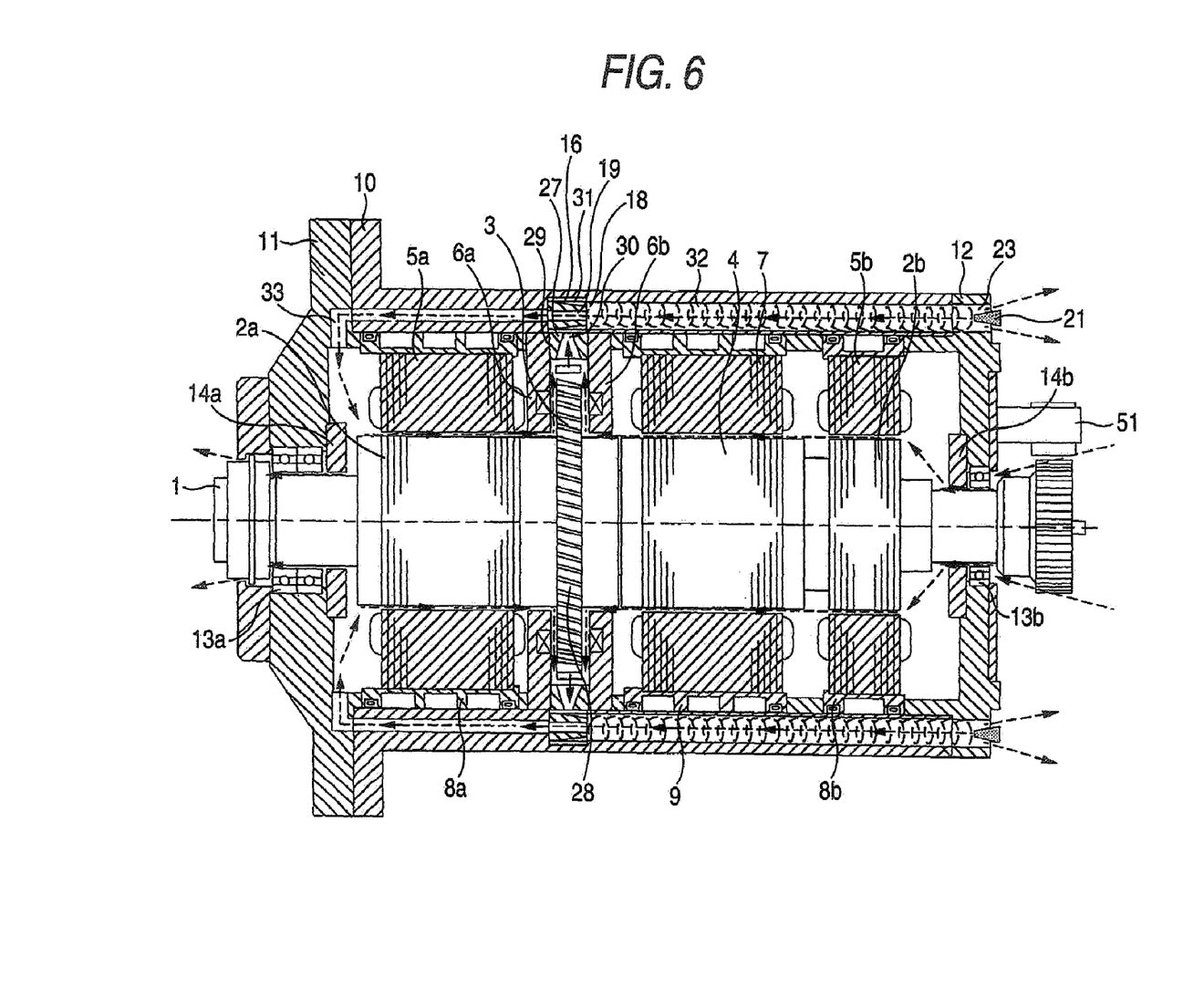
FIG. 6 is a section view showing the whole configuration of a magnetic bearing spindle unit of Embodiment 3 of the invention.
Figure 7A:
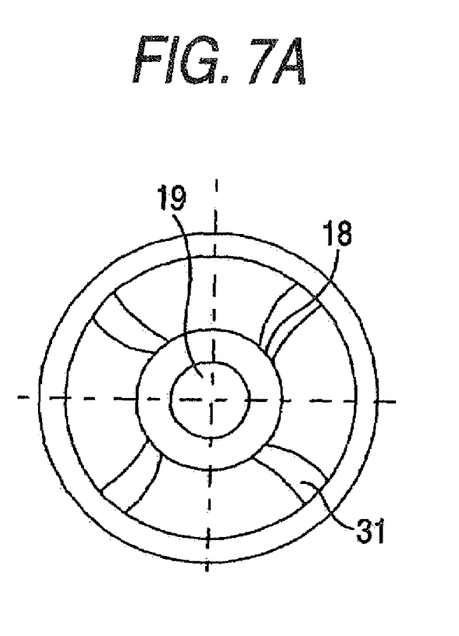
FIGS. 7A and 7B are views showing a generator structure to be used in the magnetic bearing spindle unit of Embodiment 3 of the invention.
Figure 7B:
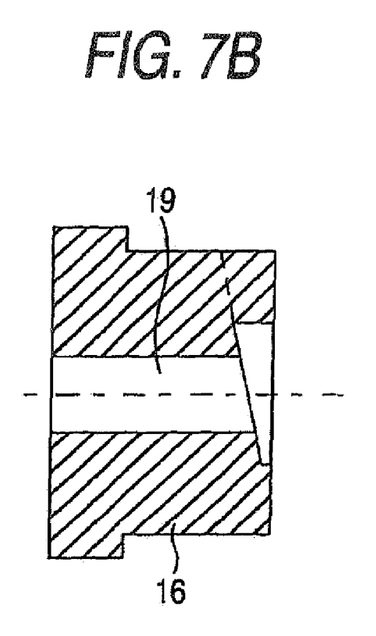

Next, Embodiment 3 of the invention will be described with reference to FIGS. 6 and 7.

In the same manner as Embodiment 1, also Embodiment 3 of the invention shows a magnetic bearing spindle unit in which a magnetic bearing apparatus is used in a spindle for rotating a tool.

The magnetic bearing spindle unit is configured in the following manner.

Namely, radial fins 28 for forming an air flow in a radial direction are disposed on the outer diameter portion of an axial magnetic bearing disc 3. In an axial positioning collar 27 for axial magnetic bearing stators 6a, 6b which are placed with being separated from the fins 28 by an adequate gap, an air suction port 29 which is more tapered as further moving from the inner diameter portion toward the outer diameter portion is disposed in plural places. Supply ports 30 which are on the tapered side communicate with outer diameter portions of generators 16, respectively. The generators 16 are positioned at positions opposed to the supply ports 30, and fixed to the interior of the frame 10. As shown in detail in FIGS. 7A and 7B (FIG. 7A is a front view, and FIG. 7B is a longitudinal section view of FIG. 7A), in each of the generators 16, in order to convert an air flow ejected from the supply port 30 to a vortex flow and allow the vortex flow to flow through an air flow path 32, a plurality of cutaway portions through which the air flow ejected from the supply port 30 is to be introduced are formed at regular intervals in the outer circumferential portion of the side face, and spiral grooves 31 which are directed from the cutaway portions toward the inner circumferential portion are formed in a side face portion. The generators 16 have an axial through hole 19 in a center portion. In FIGS. 7A and 7B, 18 denotes a vortex flow discharge port.

In the rear portion of the unit with respect to the generators 16, furthermore, the air flow paths 32 having an inner diameter which is larger than the diameter of the through holes 19 of the generators 16 are axially formed inside the frame 10 and the opposite-to-load side bracket 12. A control valve 21 is disposed in the rear end of each of the air flow paths 32. In the front portion of the unit with respect to the generators 16, cooling wind flow paths 33 which elongate from the respective through holes 19 of the generators 16 to the interior of the unit are disposed inside the frame 10 and the load side bracket 11.

The other components are configured in a similar manner as those of the magnetic bearing spindle units which have been described in Embodiments 1 and 2.

In this structure, when the rotary shaft 1 is rotated at an ultrahigh speed, a high-speed air flow which is directed in a radial direction is produced by the effect of the radial fins 28 which are formed on the outer diameter portion of the axial magnetic bearing disc 3. The high-speed air flow is introduced into each of the air suction ports 29 disposed in the axial positioning collar 27 for the axial magnetic bearing stators 6a, 6b. Since the air suction port 29 has the shape which is more tapered as further moving in the outer radial direction, the air flow is formed as high-pressure air at the timing when the air flow is discharged from the supply port 30 of the outer diameter portion of the collar 27. The high-pressure air is sent to the outer diameter portion of the generator 16, and, at the timing when discharged from the discharge port 18 of the generator 16, formed as a high-pressure vortex flow by the effect of the spiral groove formed in the generator 16. The high-pressure vortex flow is discharged to the inner circumferential face of the air flow path 32 in the frame 10 which is adjacent on the rear side of the unit, in a tangential direction of the face at a speed close to that of sound. Among the portions of the rotary shaft 1, the axial magnetic bearing disc 3 has the largest outer diameter, and hence the largest effect is attained as compared with cases where a high-speed vortex flow is produced by other portions. The high-speed vortex flow which is sent into the air flow path 32 is subjected to a large centrifugal force during a process in which the vortex flow moves toward the control valve 21 that is disposed in the rear of the flow path, so that the pressure and the density are rapidly raised, the pipe resistance is increased, and the temperature is raised. As a result, the vortex flow is formed into hot wind to be discharged to the outside air from a hot-wind discharge port 23. At the same time, by the centrifugal force of the high-speed vortex flow, air in the vicinity of the center of the air flow path 32 is lowered in density, and, while rotating in the same direction as the outer vortex flow of the hot wind, moves in the opposite direction, toward the through hole 19 of the generator 16 which is opposite to the hot-wind discharge port 23. During the moving process, because of a decelerating braking action, the inner vortex flow conducts a work on the outer vortex flow, and the temperature is lowered. Therefore, the vortex flow is formed as cooling wind to be passed through the through hole 19 of the generator 16 toward the front side of the unit as indicated by the arrows. Since the through hole 19 is smaller than the inner diameter of the air flow path 32, only the inner vortex flow formed as cooling wind can be passed through the through hole, so that an efficient structure is attained. The cooling wind is then sent to a cooling wind flow path 33 disposed in the frame 10 and the load side bracket 11 which are positioned in front of the generator 16, and transported to the interior of the unit to cool the surface of the rotary shaft 1, and the stators.

Namely, this structure can efficiently cool the rotary shaft 1 and the stators on the same principle as that described in Embodiments 1 and 2.

Similarly, the amount of the cooling wind can be adjusted by adjusting the control valves 21.

Embodiment 4

Figure 8:
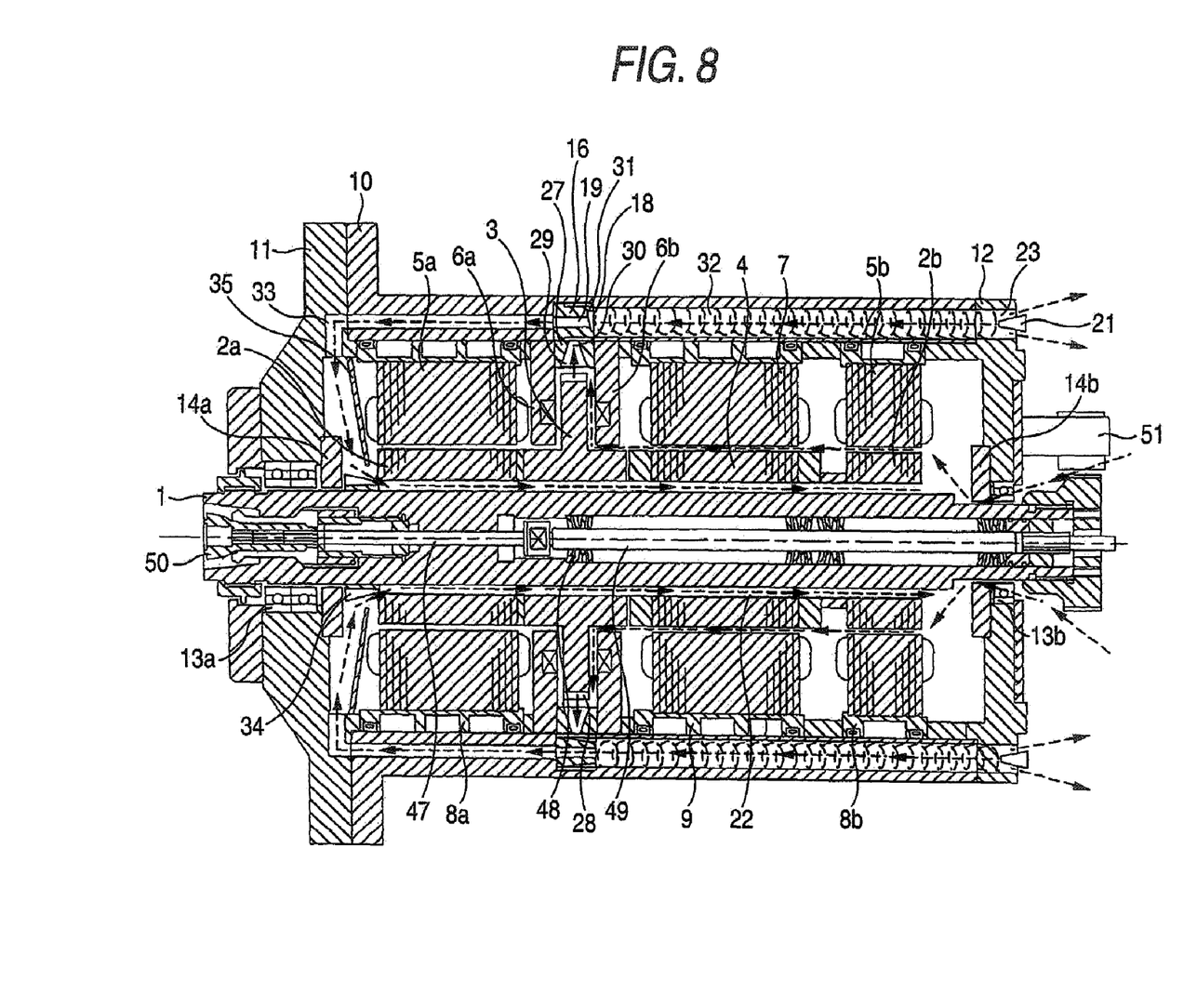
FIG. 8 is a section view showing the whole configuration of a magnetic bearing spindle unit of Embodiment 4 of the invention.

Next, Embodiment 4 of the invention will be described with reference to FIG. 8.

In the same manner as Embodiment 1, also Embodiment 4 of the invention shows a magnetic bearing spindle unit in which a magnetic bearing apparatus is used in a spindle for rotating a tool.

The magnetic bearing spindle unit is configured in the following manner.

Namely, in the same manner as Embodiment 3, the unit is structured so that radial fins 28 are disposed on the outer diameter portion of an axial magnetic bearing disc 3, and cooling wind is produced by the effect of the fins. In Embodiment 4, furthermore, cooling wind flow paths 22 which are axially passed are formed inside the rotary shaft 1, and fins 34 which allow the cooling wind to be easily introduced into the cooling wind flow paths 22 are a disposed at positions opposed to an opening of a cooling wind flow path 33 in the rotary shaft 1. A cooling wind guide plate 35 for efficiently introducing the cooling wind ejected from the cooling wind flow path 33 into the cooling wind flow paths 22 is disposed by clamping a peripheral portion of the guide plate between a load side bracket 11 and a frame 10.

Each of the cooling wind flow paths 22 is configured by a spline-like portion which is formed in the outer circumferential portion of the rotary shaft 1 so as to elongate from the portion of the rotary shaft 1 where the fins 34 are disposed, to the vicinity of a displacement sensor 14b, and the inner peripheral walls of the rear radial magnetic bearing rotor 2b, the spindle motor rotor 4, the axial magnetic bearing disc 3, the front radial magnetic bearing rotor 2a, and the collar positioned between the rotors. The inner peripheral walls close opening portions of the spline-like portion.

The other components are configured in a similar manner as those of the magnetic bearing spindle unit which has been described in Embodiment 3.

In this structure, when the rotary shaft 1 is rotated at an ultrahigh speed, a high-speed air flow which is directed in a radial direction is produced by the effect of the radial fins 28 which are formed on the outer diameter portion of the axial magnetic bearing disc 3. The high-speed air flow is introduced into each of the air suction ports 29 disposed in the axial positioning collar 27 for the axial magnetic bearing stators 6a, 6b. Since the air suction port 29 has the shape which is more tapered as further moving in the outer radial direction, the air flow is formed as high-pressure air at the timing when the air flow is discharged from the supply port 30 of the outer diameter portion of the collar 27. The high-pressure air is sent to the outer diameter portion of the generator 16, and, at the timing when discharged from the discharge port 18 of the generator 16, formed as a high-pressure vortex flow by the effect of the spiral groove formed in the generator 16. The high-pressure vortex flow is discharged to the circumferential face of the air flow path 32 in the frame 10 which is adjacent on the rear side of the unit, in a tangential direction of the face at a speed close to that of sound. Among the portions of the rotary shaft 1, the axial magnetic bearing disc 3 has the largest outer diameter, and hence the largest effect is attained as compared with cases where a high-speed vortex flow is produced by other portions. The high-speed vortex flow which is sent into the air flow path 32 is subjected to a large centrifugal force during a process in which the vortex flow moves toward the control valve 21 that is disposed in the rear of the flow path, so that the pressure and the density are rapidly raised, the pipe resistance is increased, and the temperature is raised. As a result, the vortex flow is formed into hot wind to be discharged to the outside air from a hot-wind discharge port 23. At the same time, by the centrifugal force of the high-speed vortex flow, air in the vicinity of the center of the air flow path 32 is lowered in density, and, while rotating in the same direction as the outer vortex flow of the hot wind, moves in the opposite direction, toward the through hole 19 of the generator 16 which is opposite to the hot-wind discharge port 23. During the moving process, because of a decelerating braking action, the inner vortex flow conducts a work on the outer vortex flow, and the temperature is lowered. Therefore, the vortex flow is formed as cooling wind to be passed through the through hole 19 of the generator 16 toward the font side of the unit as indicated by the arrows. Since the through hole 19 is smaller than the inner diameter of the air flow path 32, only the inner vortex flow formed as cooling wind can be passed through the through hole, so that an efficient structure is attained. The cooling wind is then sent to a cooling wind flow path 33 disposed in the frame 10 and the load side bracket 11 which are positioned in front of the generator 16, and transported to the interior of the unit. Most of the cooling wind is concentrated to the vicinity of the fins 34 disposed on the rotary shaft 1, by the cooling wind guide plate 35. The fins 34 are formed so as to introduce the cooling wind to the cooling wind flow paths 22 formed inside the rotary shaft 1. Therefore, most of the cooling wind is passed through the cooling wind flow paths 22 to efficiently cool the rotary shaft 1 during the process.

Namely, this structure can efficiently cool the rotary shaft 1 on the same principle as that described in Embodiments 1 to 3. Similarly, the amount of the cooling wind can be adjusted by adjusting the control valves 21.

Embodiment 5

Figure 9:
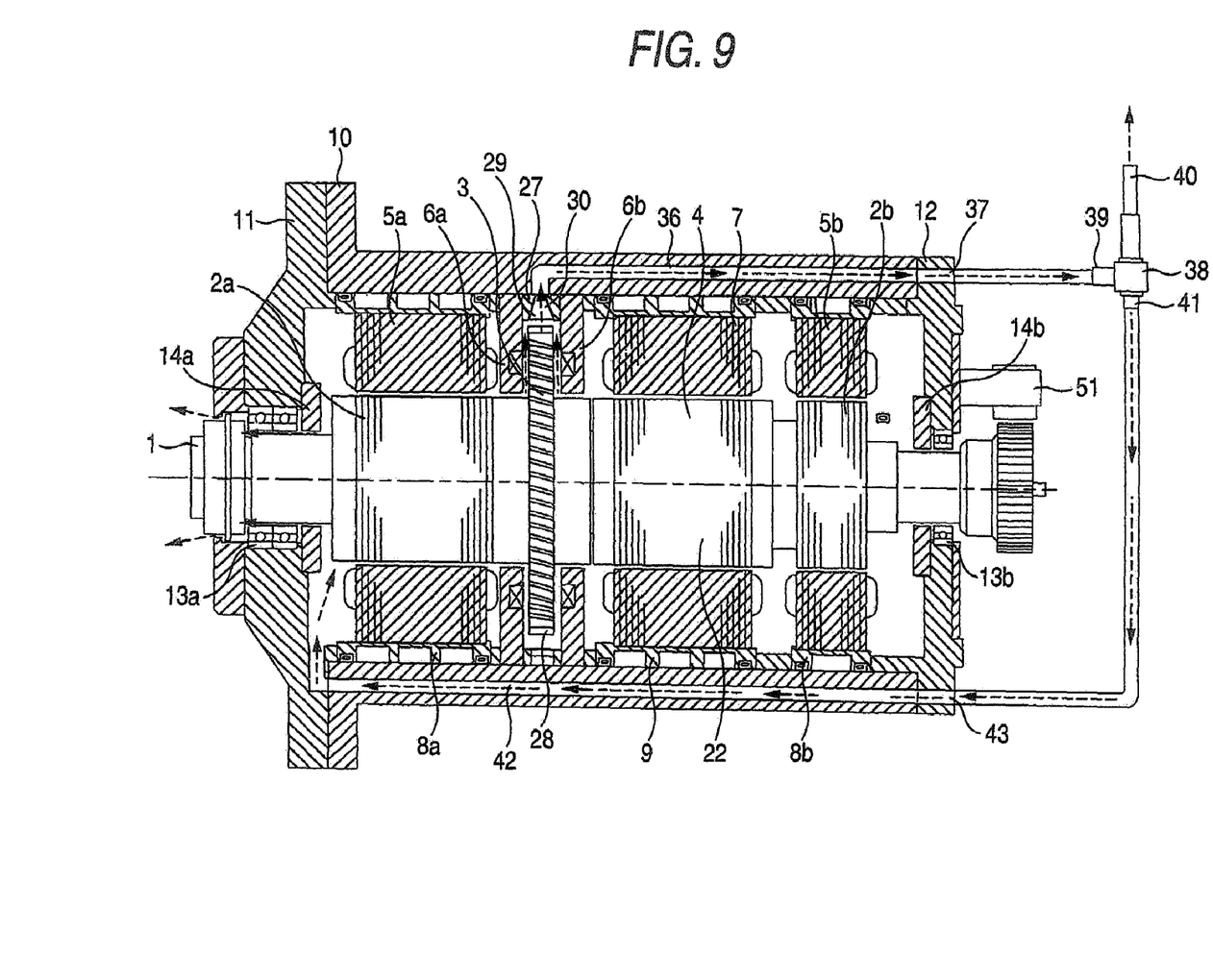
FIG. 9 is a section view showing the whole configuration of a magnetic bearing spindle unit of Embodiment 5 of the invention.

Next, Embodiment 5 of the invention will be described with reference to FIG. 9.

In the same manner as Embodiment 1, also Embodiment 5 of the invention shows a magnetic bearing spindle unit in which a magnetic bearing apparatus is used in a spindle for rotating a tool.

The magnetic bearing spindle unit is configured in the following manner.

Namely, radial fins 28 for forming an air flow in a radial direction are disposed on the outer diameter portion of an axial magnetic bearing disc 3. An axial positioning collar 27 for axial magnetic bearing stators 6a, 6b is placed with being separated from the fins 28 by an adequate gap. In the collar 27, an air suction port 29 which is more tapered as further moving from the inner diameter portion toward the outer diameter portion is disposed. A supply port 30 which is on the tapered side is connected to a high-pressure air flow path 36 which is disposed in a frame 10 and an opposite-to-load side bracket 12. A high-pressure air discharge port 37 of the opposite-to-load side bracket 12 is connected by a pipe or the like to a high-pressure air suction port 39 of a vortex flow cooler (cooling wind producing means) 38 which is disposed outside the magnetic bearing spindle unit. In the magnetic bearing spindle unit, a cooling wind flow path 42 which is passed from the outside of the unit into the unit is formed in a place which does not overlap with the high-pressure air flow path 36, and in the frame 10, the load side bracket 11, and the opposite-to-load side bracket 12, and a cooling wind suction port 43 of the opposite-to-load side bracket 12 and a cooling wind discharge port 41 of a vortex flow generator 38 are connected to each other by a pipe or the like.

The vortex flow cooler 38 is configured by a tube, a generator which converts a high-pressure air flow to a vortex flow, and a control valve which adjusts the amount of cooling wind, and operates to eject cooling wind to the cooling wind discharge port 41 in a similar manner as that which has been described in the embodiment above.

In this structure, when the rotary shaft 1 is rotated at an ultrahigh speed, a high-speed air flow which is directed in a radial direction is produced by the effect of the radial fins 28 which are formed on the outer diameter portion of the axial magnetic bearing disc 3. The high-speed air flow is introduced into each of the air suction port 29 disposed in the axial positioning collar 27 for the axial magnetic bearing stators 6a, 6b. Since the air suction port 29 has the shape which is more tapered as further moving in the outer radial direction, the air flow is formed as high-pressure air at the timing when the air flow is discharged from the supply port 30 of the outer diameter portion of the collar 27. The high-pressure air is passed through the high-pressure air flow path 36 which is disposed inside the frame 10 and the opposite-to-load side bracket 12, to be discharged from the high-pressure air discharge port 37, and then sent to the high-pressure air suction port 39 of the vortex flow cooler 38. On the same principle as that described in the embodiment above, heat exchange is conducted in the vortex flow cooler 38. The hot wind is discharged to the outside air in a place where the hot wind does not thermally affect the magnetic bearing spindle unit through the hot wind discharge port 40. The cooling wind which is produced by the vortex flow cooler 38 is discharged from the cooling wind discharge port 41, and then sent to the magnetic bearing spindle unit through the cooling wind suction port 43 connected thereto. The cooling wind is passed through the cooling wind flow path 42 to be sent into the unit, thereby efficiently cool the rotary shaft 1 and the stators.

In the embodiment also, the cooling wind ejected from the vortex flow cooler 38 may be flown around the rotary shaft 1 as shown in Embodiments 1, 3, and 4.

INDUSTRIAL APPLICABILITY

As described above, the magnetic bearing apparatus of the invention is suitable for being used in a spindle unit of a machine tool or the like.

What is claimed is:

1. A magnetic bearing apparatus comprising: a rotatable rotary shaft to which a radial magnetic bearing rotor and an axial magnetic bearing disc are secured; electromagnets which are arranged with forming a small gap with respect to said radial magnetic bearing rotor and said axial magnetic bearing disc; and a case housing them, wherein said apparatus further comprises: cooling wind producing means that produces cooling wind of a low temperature, and that has: fins which are disposed on said axial magnetic bearing disc, and which produces an air flow directed in an outer radial direction of said axial magnetic bearing disc; a supply port which is positioned in an outer circumferential portion of said fins, and through which the air flow produced by said fins is introduced and ejected as a high-speed air flow in the outer radial direction; a generator which converts the high-speed air flow ejected from said supply port, to a vortex flow; an air flow path through which the high-speed vortex flow produced by said generator is to flow; and a control valve which is disposed on a side of said air flow path opposite to said generator; and a cooling wind flow path through which the low-temperature cooling wind produced by said cooling wind producing means is to flow into said magnetic bearing apparatus.

2. A magnetic bearing apparatus according to claim 1, wherein a guide portion which guides the low-temperature cooling wind to a rotary shaft portion is disposed.

3. A magnetic bearing apparatus according to claim 1, wherein said cooling wind flow path has: a cooling wind flow path which is disposed in said case, and through which the low-temperature cooling wind produced by said cooling wind producing means is to flow; a guide plate which guides the cooling wind that has been passed through said cooling flow path, to a rotary shaft portion; and a cooling wind flow path which is disposed in said rotary shaft portion, and through which the cooling wind that has been guided by said guide plate is to axially flow, thereby cooling said rotary shaft portion.

4. A magnetic bearing apparatus comprising: a rotatable rotary shaft to which a radial magnetic bearing rotor and an axial magnetic bearing disc are secured; electromagnets which are arranged with forming a small gap with respect to said radial magnetic bearing rotor and said axial magnetic bearing disc; and a case housing them, wherein said apparatus further comprises: cooling wind producing means that produces cooling wind of a low temperature, and that has: fins which are disposed on said axial magnetic bearing disc, and which produces an air flow directed in an outer radial direction of said axial magnetic bearing disc; a supply port which is positioned in an outer circumferential portion of said fins, and through which the air flow produced by said fins is introduced and ejected as a high-speed air flow in the outer radial direction; an air flow path through which the high-speed air flow ejected from said supply port is to flow; a generator which converts the high-speed air flow ejected from said air flow path, to a vortex flow; a tube through which the high-speed vortex flow produced by said generator is to flow; and a control valve which is disposed on a side of said tube opposite to said generator; and a cooling wind flow path through which the low-temperature cooling wind produced by said cooling wind producing means is to flow into said magnetic bearing apparatus.

* * * * *